US010122227B1

United States Patent
Long (10) Patent No.: US 10,122,227 B1
(45) Date of Patent: Nov. 6, 2018

(54) SKEWED HALBACH ARRAY ROTOR

(71) Applicant: Kitty Hawk Corporation, Mountain View, CA (US)

(72) Inventor: Geoffrey Alan Long, Montara, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/627,800

(22) Filed: Jun. 20, 2017

(51) Int. Cl.
*H02K 1/27* (2006.01)
*H02K 1/28* (2006.01)
*H02K 15/03* (2006.01)

(52) U.S. Cl.
CPC ............... *H02K 1/27* (2013.01); *H02K 1/28* (2013.01); *H02K 15/03* (2013.01)

(58) Field of Classification Search
CPC .. H02K 1/27; H02K 1/32; H02K 1/28; H02K 15/03
USPC ............ 310/156.38, 156.43, 156.45, 156.47
See application file for complete search history.

(56) References Cited

U.S. PATENT DOCUMENTS

| | | | | |
|---|---|---|---|---|
| 5,774,976 A | * | 7/1998 | Stark | H01F 41/0253 29/732 |
| 6,849,960 B2 | * | 2/2005 | Hartman | H02J 7/32 290/1 C |
| 2007/0035192 A1 | * | 2/2007 | Jeon | H02K 1/2786 310/156.38 |
| 2012/0091832 A1 | * | 4/2012 | Soderberg | C08J 3/00 310/44 |
| 2012/0262019 A1 | * | 10/2012 | Smith | H02K 1/2766 310/156.07 |
| 2013/0002066 A1 | * | 1/2013 | Long | H02K 3/47 310/54 |
| 2015/0061440 A1 | | 3/2015 | Catalan | |

* cited by examiner

*Primary Examiner* — John K Kim
(74) *Attorney, Agent, or Firm* — Van Pelt, Yi & James LLP (57) ABSTRACT

In various embodiments, a skewed Halbach array rotor as disclosed herein includes (1) a plurality of magnets arranged and oriented relative to adjacent ones of the magnets to form a substantially cylindrical Halbach array the combined magnetic field of which is concentrated on one side of the array, wherein the substantially cylindrical Halbach array has a rotational axis and each of at least a subset of the magnets is oriented in a fixed position such that the longitudinal axis of the magnet is at a prescribed skew angle to the rotational axis; and (2) a retaining structure adjacent to at least a subset of the magnets comprising the plurality of magnets and configured to hold one or more of said subset of magnets in place.

11 Claims, 8 Drawing Sheets

SKEWED HALBACH ARRAY ROTOR

BACKGROUND OF THE INVENTION

A Halbach array is an arrangement of magnets that enhances the magnetic field on one side of the array while largely minimizing, through cancellation, the magnetic field on the opposite side of the array. Successive magnets in the array are rotated in a specific sequence of orientations, which results in the magnetic fields of the magnets comprising the array to combine in ways that enhance the resulting (i.e., net or combined) magnetic on one side of the array, while minimizing the magnet field on the other side.

Motors comprising Halbach array rotors are known. In one class of motor, a stator comprising an iron core wrap in windings operates as a stationary electromagnet. An interior rotor comprising a Halbach array of permanent magnets arranged in a cylindrical array such that the magnetic field of the rotor is concentrated on the outside of the array is provided. Voltages are applied to the respective windings of the stator to generate magnetic forces that interact with the enhanced outer magnetic field of the rotor to cause the rotor to rotate about a longitudinal access of rotation. The rotor typically is coupled mechanically to a shaft or other structure to transmit the torque to a load, such as an aircraft lift fan, propeller, or some other load.

In the typical approach, the magnets comprising the Halbach array of such a rotor have been substantially rectangular in shape, and have been arranged with the longitudinal axis of the magnets substantially aligned (i.e., parallel) with the axis of rotation of the rotor.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A Halbach array rotor in which the magnets are skewed relative to the rotational axis of the rotor is disclosed. In various embodiments, rectangular block magnets, or other magnets that have a long dimension and associated longitudinal axis, are arranged in a Halbach array with each magnet skewed such that its longitudinal axis is at a prescribed angle to the rotational axis of the rotor. In various embodiments, skewing the magnets comprising the Halbach array provides the benefits associated with using a Halbach array (e.g., higher torque for same motor weight and input power, as compared to an electric motor using a conventional rotor not comprising a Halbach array) but with less acoustic noise and vibration than may be generated by a motor comprising a conventional (non-skewed) Halbach array rotor.

Figure 1A:
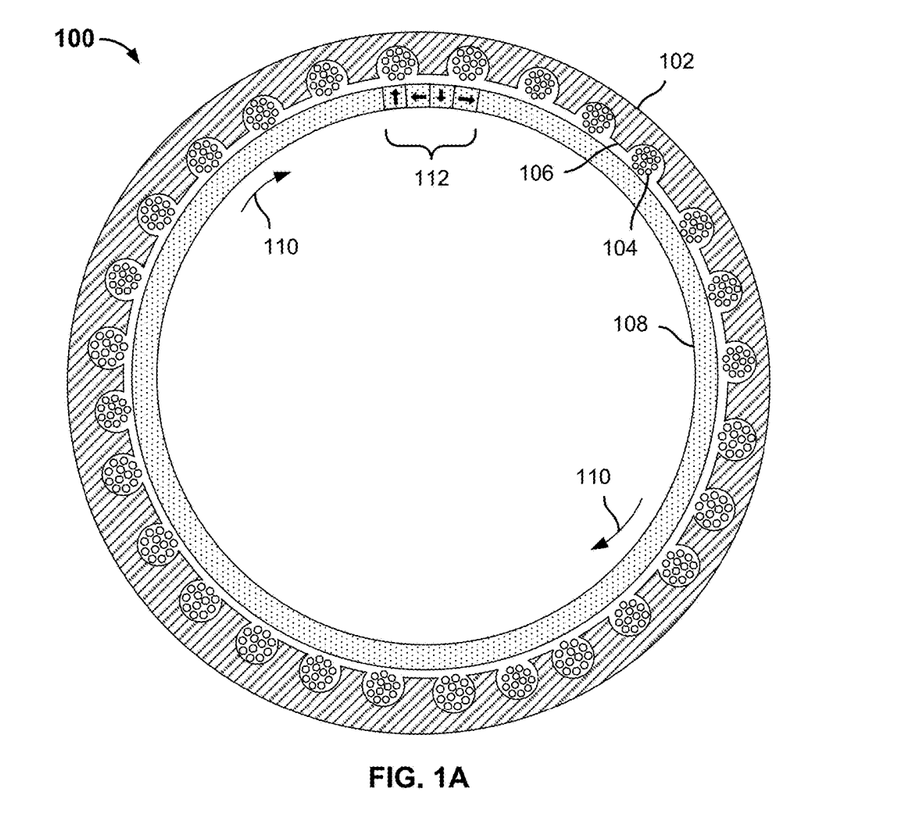
FIG. 1A illustrates an embodiment of a Halbach array motor.

FIG. 1A illustrates an embodiment of a Halbach array motor. In the example shown, motor 100 includes a stator comprising an iron core 102 with windings 104 wound around the iron core 102. In this example, windings 104 are wound around and/or between stator teeth 106. In operation, elements not shown in FIG. 1A are used to cause current to flow through windings 104 to generate a magnetic field that interacts with magnets comprising rotor 108 to cause the rotor to rotate about a rotational axis of motor 100, as indicated by arrows 110.

In various embodiments, the rotor 108 comprises a Halbach array of permanent magnets having a long dimension, such as a rectangular block magnet that is longer in one dimension than the others. In the example shown, the magnets comprising the rotor are arranged in a circular array. In various embodiments, adjacent magnets comprising the rotor 108 are arranged in sets of four magnets oriented in a repeating sequence of orientations, such as the set of magnets 112. In some embodiments, an array comprising 64 magnets, i.e., 16 sets of 4 magnets like magnets 112, may be used.

Figure 1B:
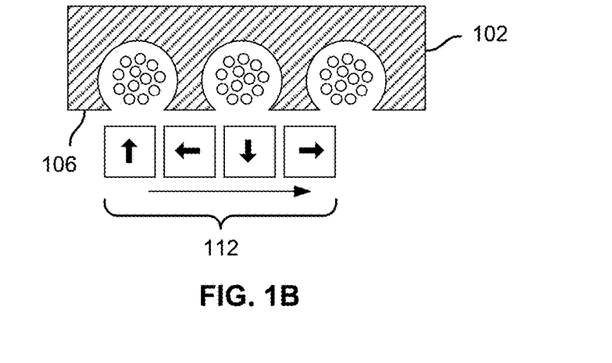
FIG. 1B shows a magnified view of elements comprising an embodiment of a Halbach array motor.

FIG. 1B shows a magnified view of elements comprising an embodiment of a Halbach array motor. In the example show magnets 112 can be seen to rotate past successive ones of teeth 106 of stator 102, with a long face of each magnet 112 passing across an opposite face of each tooth 106 as it passes. It is advantageous, in terms for efficient production of torque (e.g., torque/weight) to have the gap between the faces of teeth 106 and the opposite faces of magnets 112 to be as small as possible. However, in a motor that has a conventional Halbach array rotor, the narrowness of this gap may result in excessive noise, e.g., due to magnetic forces between the magnets 112 of rotor 102 and the faces of teeth 106 as the magnets 112 rotate past them.

Figure 2:
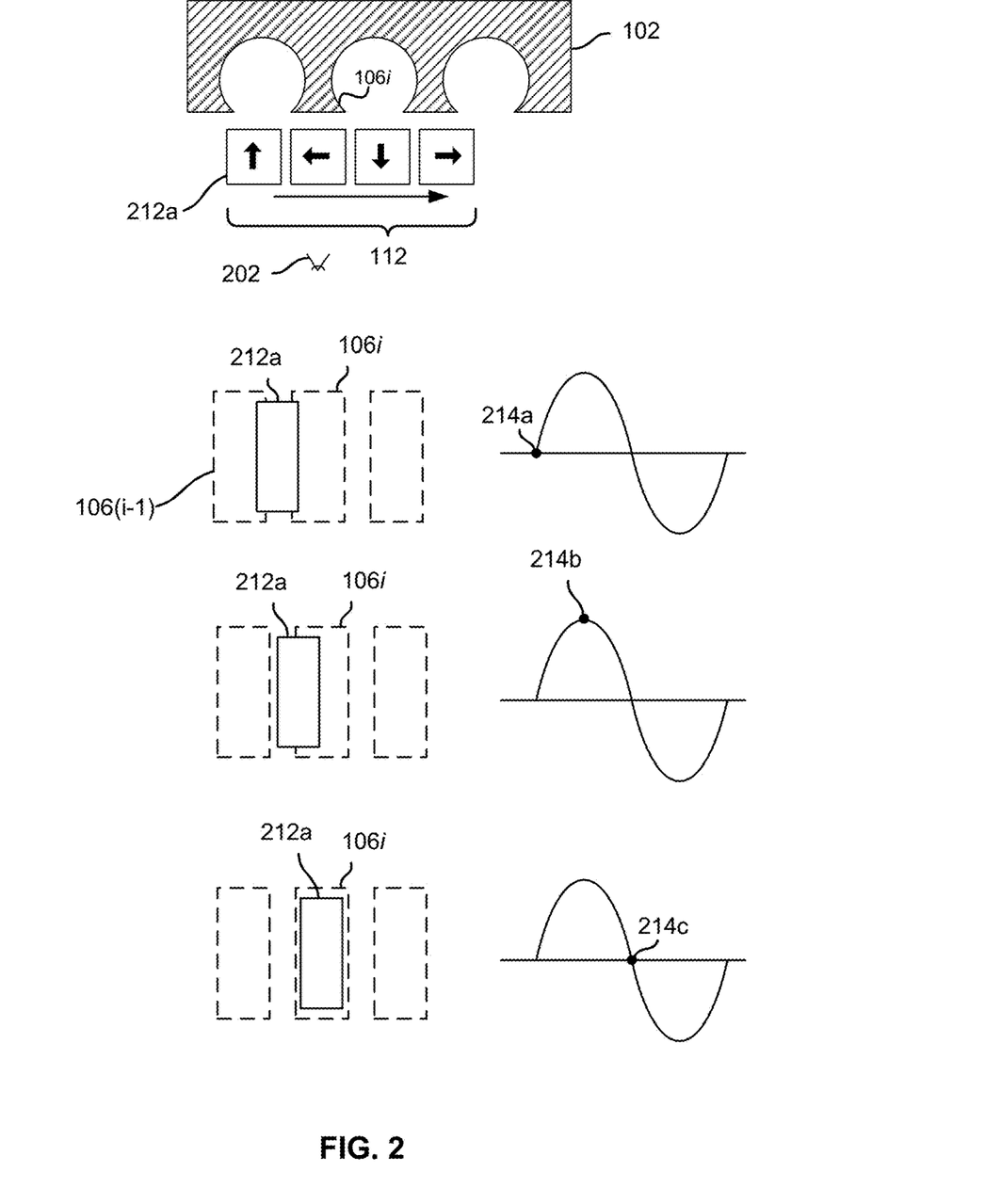
FIG. 2 shows a magnified view of elements comprising an embodiment of a Halbach array motor.

FIG. 2 shows a magnified view of elements comprising an embodiment of a Halbach array motor. In the example shown, magnets 112 are shown to include a magnet 212a in a position to rotate past a set of three teeth centered on tooth 106i. The lower three sets of images comprising FIG. 2 show the same magnet 212a passing the set of teeth centered on tooth 106i, at three successive moments in time, as viewed from a vantage point 202, e.g., looking radially out from a center of the rotor 108. The upper of three images shows the magnet 212a just beginning to overlap the tooth 106i while still overlapping slightly the preceding tooth 106(i−1), the middle image shows the magnet 212a at a point overlapping just tooth 106i, and the bottom image shows the magnet 212 at a point of maximum overlap with tooth 106i. For each of the three positions, a plot of the magnetic force of attraction between the magnet 212a and the iron comprising the set of three teeth centered on tooth 106i is shown. As the magnet 212a is positioned between the tooth 106i and the preceding tooth 106(i−1), the forces between the magnet 212a and adjacent teeth cancel and zero net force is experienced, e.g., point 214a. As the magnet 212a increasingly overlaps tooth 106i, as in the middle drawing, the net magnet force between the magnet 212a and adjacent teeth increases to a maximum force 214b as shown in the middle plot. Finally, the net magnetic forces balance out to zero again once the magnet 212a fully overlaps with tooth 106i, as indicated by point 214c at the bottom plot.

As noted, in motors comprising Halbach array rotors as shown in FIG. 2, in which the long axis of the magnets 112 are oriented substantially parallel to the axis of rotation, the magnetic force associated with the interaction of the magnets 112 and the faces of teeth 106 comprising the stator increases sharply and rises to a peak, such as peak 214b of FIG. 2, which may result in loss of efficiency (e.g., reduced torque) and/or excessive acoustic noise and vibration due to the large oscillating force on the structure of the motor. It should be noted that in these figures, the relative number of rotor magnets per stator teeth is chosen for illustrative purposes. The number of combinations of number of poles and number of teeth can is vast and the phenomenon described here applies to all of them. Also, the plot of force versus magnet position is shown as roughly sinusoidal, but in many cases higher harmonics are present depending on the design of the teeth and magnets, but qualitatively the ideas described here still apply.

A skewed Halbach array rotor, in which the long axis of magnets comprising the rotor is skewed at a non-zero angle to the rotational axis of the rotor, is disclosed. In various embodiments, skewing the rotor magnets reduces acoustic noise and vibration at least in part by reducing the peak magnetic force between magnets comprising the rotor and stator teeth past which the rotor magnets are translated by rotation of the rotor and spreading the interaction over a longer interval.

Figure 3:
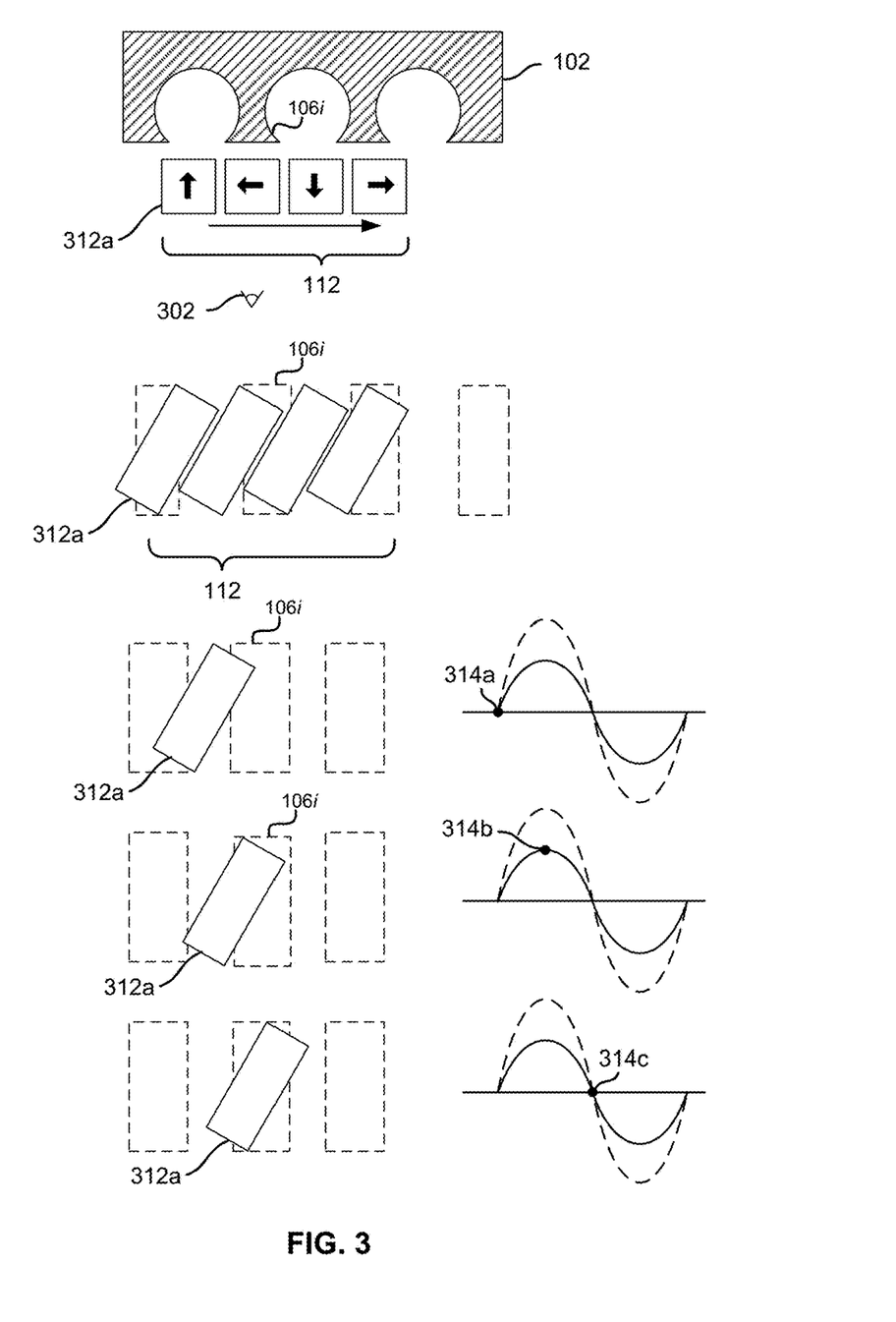
FIG. 3 shows a magnified view of elements comprising an embodiment of a motor comprising a skewed Halbach array rotor.

FIG. 3 shows a magnified view of elements comprising an embodiment of a motor comprising a skewed Halbach array rotor. In the example shown, magnets 112 of FIG. 1 are shown in the image second from the top to be oriented (skewed) at angles to the rotational axis of the rotor, which in this example is the same as the long axis of the teeth 106 of stator 102. In the example shown, the magnets 112 include a magnet 312a, shown in the lower three images of FIG. 3 to translate past opposite faces of a set of teeth centered on tooth 106i. The magnetic force of attraction between the magnet 312a and the face of tooth 106i opposite at each of the three points is shown in the far right (points 314a, 314b, and 314c). The solid line curve represents the magnetic force between the magnet 312a and the teeth opposite as magnet 312a passes the set teeth around tooth 106i. The curve of FIG. 2, in which the magnets comprising the Halbach array are not skewed relative to the rotational axis (which coincides with the long axis of the stator teeth in that example), is shown in dashed lines for comparison. The skewing of the magnets comprising in Halbach array in this example reduces the peak force (314a) between the magnet 312a and tooth 106i, relative to the unskewed Halbach array of FIG. 2, and flattens the curve, as the interaction between the magnet 312a and the teeth opposite is extended over a longer interval. For example, as shown in FIG. 3, the bottom left corner of magnet 312a (as shown) overlaps the face of the tooth preceding tooth 106i at the moment the leading point/edge, e.g., the upper right corner as shown, begins to overlap the tooth 106i, resulting in zero net magnetic force on the magnet 312a as shown by point 314a. At the point 314b of maximum force, the bottom left corner of magnet 312a (as shown) remains in proximity of the tooth preceding tooth 106i, resulting in a lower magnitude for the maximum net magnetic force. In this position, reason the net force between the magnet and the teeth is reduced at least in part due to the lower left portion of the magnet being pulled to the leftmost tooth counteracting the rightward force between the magnet and the center tooth 106i. Finally, at the point of maximum overlap between magnet 312a and tooth 106i the magnet forces between the magnet 312a and the teeth opposite (centered on tooth 106i) balance out to zero again, as indicated by point 314c. In various embodiments, skewing the magnets comprising the Halbach array, and thereby reducing the peak magnetic force between the magnets and the stator teeth opposite them, and flattening/extending the interaction of each over a longer interval, may reduce acoustic noise and vibration relative to an un-skewed Halbach array and/or allow the advantages of using a Halbach array (e.g., increased torque per motor weight, etc.) to be realized without excessive (or at least with relatively less) acoustic noise and vibration.

Figure 4A:
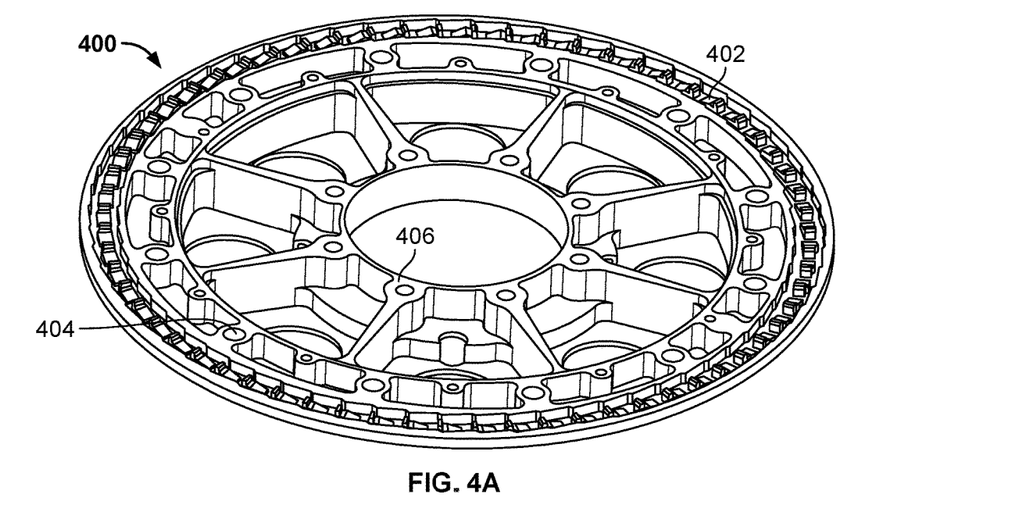
FIG. 4A illustrates a component comprising an embodiment of a skewed Halbach array rotor.

FIG. 4A illustrates a component comprising an embodiment of a skewed Halbach array rotor. In various embodiments, the aluminum (or other non-ferrous material) end plate 400 may be used to secure magnets comprising a skewed Halbach array rotor in position and to provide a way to bolt or otherwise attach a shaft or other structure to transmit torque to a load. In the example shown, end plate 400 includes a plurality of evenly spaced angled block structures 402. The angled block structure 402 includes an angled block, resembling a ramp or wedge, that in various embodiments may be secure magnets comprising the skewed Halbach array at one end, and/or to (help to) hold the magnets in place at the desired skew angle during manufacture. The end plate 400 include a set of outer holes 404 to be used to bolt or otherwise secure the end plate to other components of a skewed Halbach array rotor assembly and a set of inner holes 406 to be used to bolt a shaft or other power take off structure to the end plate, e.g., a shaft to drive a load, such as an aircraft propeller or lift fan, ground vehicle power train, etc.

Figure 4B:
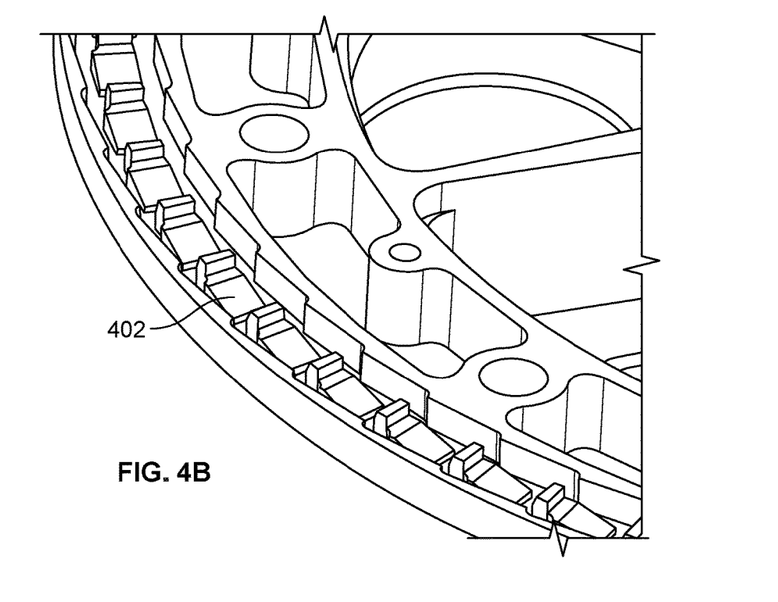
FIG. 4B shows a magnified view of a component comprising an embodiment of a skewed Halbach array rotor.

FIG. 4B shows a magnified view of a component comprising an embodiment of a skewed Halbach array rotor. In the example shown, each angled block structure 402 of end plate 400 can be seen to include an angled ramp/wedge portion to receive and hold an end of a magnet comprising the Halbach array at a desired skew angle, and an end tab to prevent the magnet from slipping out of the angled block structure 402.

Figure 5:
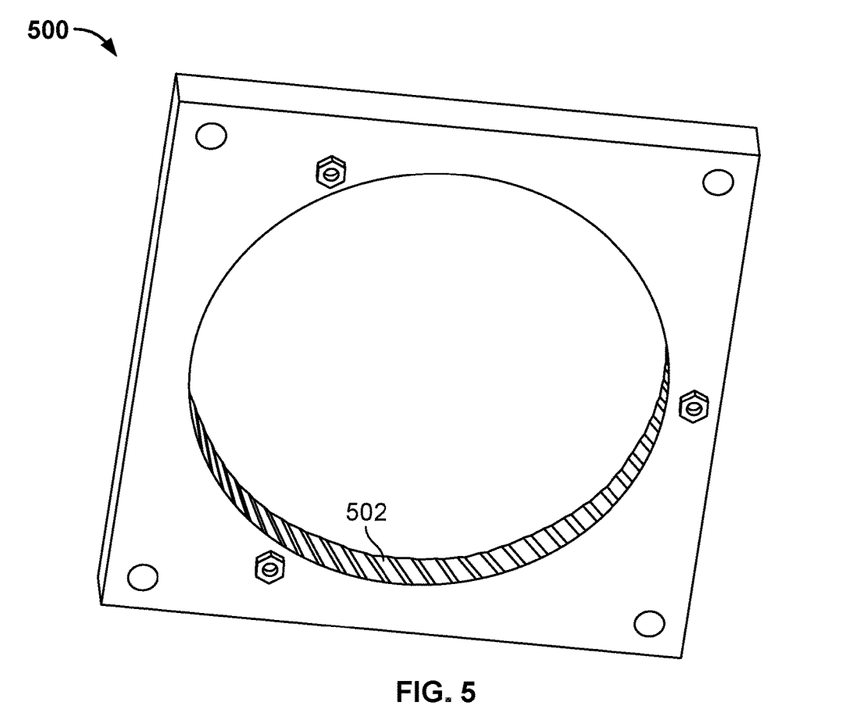
FIG. 5 illustrates an assembly fixture used in some embodiments to manufacture a skewed Halbach array rotor.

FIG. 5 illustrates an assembly fixture used in some embodiments to manufacture a skewed Halbach array rotor. In the example shown, the assembly fixture 500 comprises an iron plate with a large substantially annular orifice. The inner face of the annular orifice, in the example shown, has angled grooves 502 formed therein (e.g., machined, cast, etc.) to receive rectangular magnets arranged to form a Halbach array, and to hold them in place during at least initial phases of manufacture of a skewed Halbach array rotor as disclosed herein. In some embodiments, a retainer ring, magnet guide, or other structure may be inserted in the annular orifice. The retainer ring, magnet guide, or other structure may have an outer diameter less than an inner diameter of the annular orifice, and the assembly fixture and the inserted retainer ring, magnet guide, or other structure may define a plurality of magnet positions in which magnets comprising the Halbach array may be inserted. In various embodiments, epoxy or other materials may be used to fix magnets in position in the retainer ring, magnet guide, or other structure. The epoxy or other material may be cured, and the retainer ring, magnet guide, or other structure and magnets affixed thereto may be removed, in a subsequent step in the manufacturing process, from the assembly fixture 500. In various embodiments, the assembly fixture 500 comprises a tool used in the manufacturing process, but is not a component of a finished skewed Halbach array rotor made using the assembly fixture 500.

Figure 6:
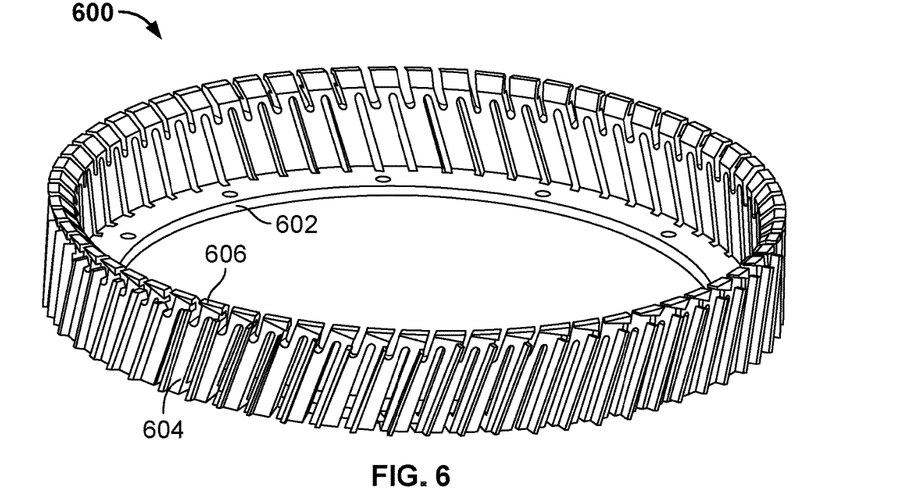
FIG. 6 illustrates a retainer ring and/or magnet guide used in some embodiments to manufacture a skewed Halbach array rotor.

FIG. 6 illustrates a retainer ring and/or magnet guide used in some embodiments to manufacture a skewed Halbach array rotor. In some embodiments, retainer ring and/or magnet guide 600 may be used together with an assembly fixture or tool, such as assembly fixture 500 of FIG. 5, to manufacture a skewed Halbach array rotor as disclosed herein. In the example shown, retainer ring and/or magnet guide 600 includes a flange 602 that enables the retainer ring and/or magnet guide 600 to be bolted or otherwise affixed to other components comprising the skewed Halbach array rotor. In some embodiments, flange 602 may serve in part to hold magnets comprising the Halbach array in place, during manufacturing and/or in operation. The retainer ring and/or magnet guide 600 further includes a plurality of slots 604 having a shape and dimension to receive a rectangular or other oblong magnet oriented at a skew angle to a rotational axis of the skewed Halbach array rotor (e.g., a central axis of the retainer ring and/or magnet guide 600. Each slot 604 has an associated stop 606 that prevents a magnet slid into a slot 604, e.g., from a bottom end of a slot 604 as shown, from being inserted any further into and/or out an opposite end of the slot 604. In some embodiments, an end plate, such as end plate 400 of FIGS. 4A and 4B, may be bolted or otherwise secured to a skewed Halbach array rotor assembly comprising the retainer ring and/or magnet guide 600 in a way that engages and holds each magnet in its corresponding slot 604, e.g., by blocking the magnet in at the end of slot 604 at which it was inserted during manufacture.

Figure 7A:
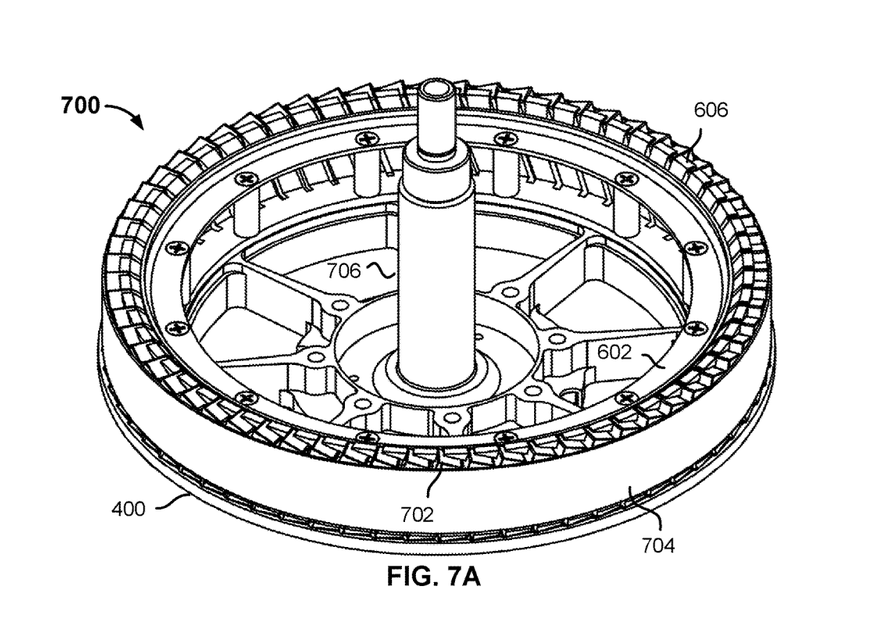
FIG. 7A shows a perspective view of an embodiment of a skewed Halbach array rotor.

FIG. 7A shows a perspective view of an embodiment of a skewed Halbach array rotor. In some embodiments, the skewed Halbach array rotor 700 of FIG. 7A may include one or more of the end plate 400 of FIGS. 4A and 4B and the retainer ring and/or magnet guide 600 of FIG. 6. In some embodiments, the skewed Halbach array rotor 700 of FIG. 7A may be manufactured at least in part using the assembly fixture 500 of FIG. 5. In the example shown, skewed Halbach array rotor 700 includes a plurality of rectangular magnets 702 arranged as a Halbach array, each magnet being fixed in a position at which a longitudinal axis of the magnet 702 is at a prescribed skew angle to a rotational axis of the skewed Halbach array rotor 700. The skewed Halbach array rotor 700 further includes an endplate 400 (at bottom as shown) in which the magnets 702 are seated at one end (bottom end as shown). The magnets 702 are further held in position, in this example, by flange 602 and stops 606 of the retainer ring and/or magnet guide 600 of FIG. 6. A band 704 wrapped around the outside of the magnets 702 provides further structure to support and hold the magnets 702 in place. In various embodiments, band 704 may be made from fiberglass, carbon fiber, Inconel, or other materials.

In various embodiments, spaces between the magnets 702 comprising the Halbach array and/or spaces between the magnets and other structures may be filled at least in part by epoxy or other materials. The ends of the magnets 702 opposite the endplate 400 and/or epoxy material or other structures adjacent thereto, such as stops 606, may in some embodiments be ground, sanded, or otherwise machined or processed to remove rough edges and/or excess materials and to provide a rotor having specified dimensions and/or clearances. In some embodiments, the magnet array is made from rectangular prismatic magnets, the outer faces of which are ground such that the outer surface of the finished array is cylindrical rather than faceted. Likewise, the fiberglass band 704 may be ground or otherwise machined in some embodiments to provide a rotor with desired dimensions, cylindricity, smoothness, and/or clearances.

In the example shown in FIG. 7A, a shaft 706 has been bolted to endplate 400. Shaft 706 may in some embodiments be adapted to be coupled to a load, such as an aircraft propeller or lift fan or some other load.

Figure 7B:
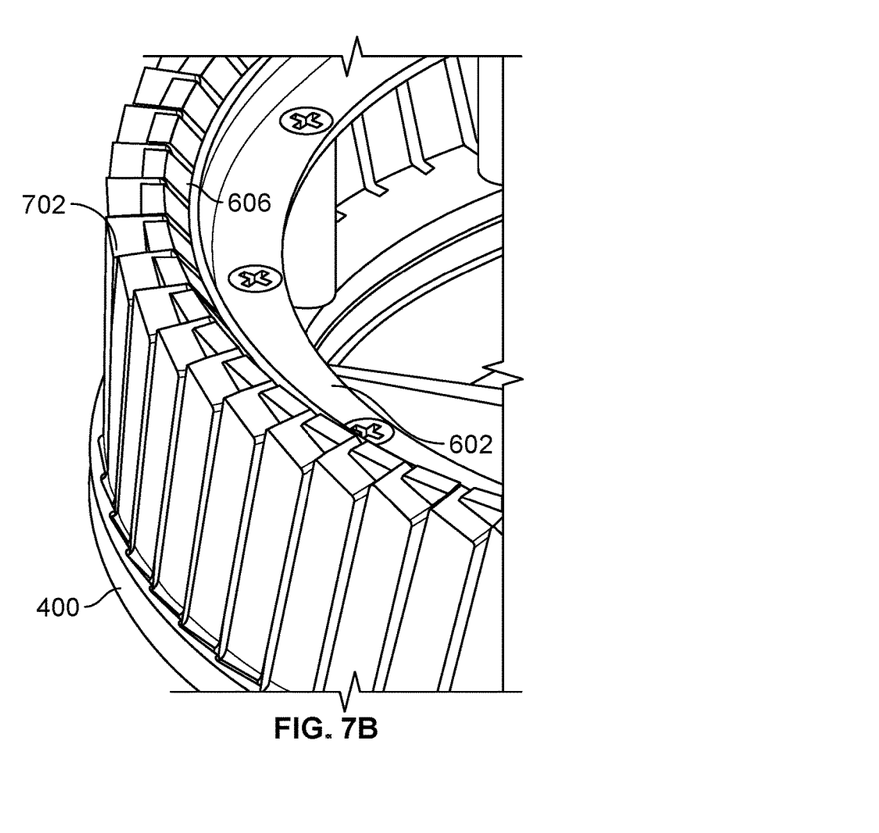
FIG. 7B shows a magnified view of an embodiment of a skewed Halbach array rotor.

FIG. 7B shows a magnified view of an embodiment of a skewed Halbach array rotor. In the example shown, the magnets 702 are seen to be held in position between the end plate 400 and the stops 606 of the retainer ring and/or magnet guide 600 of FIG. 6. Fasteners (e.g., machine screws or bolts) the heads of which are shown at the top of flange 602 as shown in FIG. 7B in this example have been used to secure the retainer ring and/or magnet guide 600 to the end plate 400, securing the magnets 702 between endplate 400 and the stops 606 of retainer ring and/or magnet guide 600.

FIGS. 4A-7 illustrate a particular assembly and parts used in some embodiments to provide a skewed Halbach array rotor, but in other embodiments other parts and/or assembly techniques may be used to provide a skewed Halbach array rotors as recited in the claims.

Figure 8:
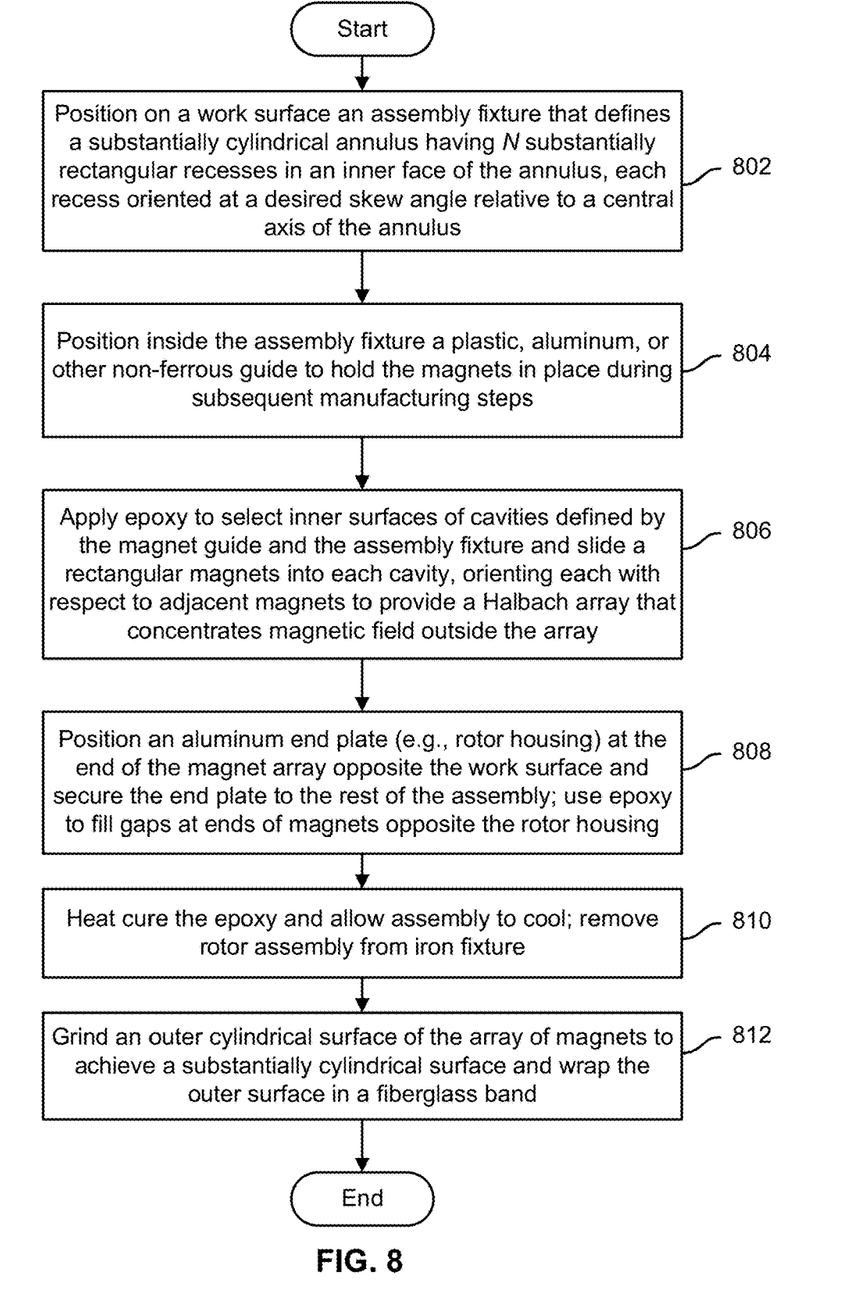
FIG. 8 is a flow chart illustrating an embodiment of a process to manufacture a skewed Halbach array rotor.

FIG. 8 is a flow chart illustrating an embodiment of a process to manufacture a skewed Halbach array rotor. In some embodiments, the process of FIG. 8 may be used to manufacture a skewed Halbach array rotor as disclosed herein, such as the skewed Halbach array rotor 700 of FIG. 7A. In the example shown, an assembly fixture that defines a substantially cylindrical annulus having N substantially rectangular recesses in an inner face of the annulus, each recess oriented at a desired skew angle relative to a central axis of the annulus, such as the assembly fixture 500 of FIG.

5, is positioned on a work surface (802). A plastic, aluminum, or other non-ferrous magnet guide adapted to hold magnets in place during subsequent manufacturing steps is positioned inside the assembly fixture (804). Epoxy is applied to select inner surfaces of cavities defined by the magnet guide on one side and the assembly fixture on the other, and a rectangular magnets is slid into each cavity, each magnet being oriented with respect to adjacent magnets to provide a Halbach array that concentrates the magnetic field outside the cylindrical array so constructed (806). An aluminum end plate is positioned at the end of the magnet array opposite the work surface and the end plate is secured to the rest of the assembly (808). Epoxy is used to fill gaps at ends of magnets opposite the rotor housing (808). The assembly is heated to cure the epoxy and then allowed to cool (810). Once cooled the rotor assembly is removed from iron fixture (810). An outer cylindrical surface of the array of magnets is ground to achieve a substantially cylindrical surface, after which the outer surface is wrapped in a fiberglass band, which may then be ground to a desired smoothness, thickness, overall rotor dimension, etc.

In various embodiments, a skewed Halbach array rotor manufactured according to the process of FIG. 8 may be included in an electric motor, such as one used to power an aircraft propeller or lift fan or the drive train of another electric vehicle, such as an electric car.

A skewed Halbach array rotor, techniques to manufacture a skewed Halbach array rotor, and motors comprising a skewed Halbach array rotor have been disclosed. In various embodiments, skewing Halbach array magnets relative to a rotation axis of a skewed Halbach array rotor as disclosed herein may enable the advantages of using a Halbach array in a radial flux motor, such as lower weight to deliver the same torque, to be realized without generating (as much) excessive noise or other disadvantages that may otherwise be associated with using a Halbach array rotor in which the magnets comprising the Halbach array are not skewed relative to the rotational axis of the rotor.

While certain example embodiments described herein involve a rotor for an inrunner motor where the field is concentrated on the outer surface of a magnet array comprising a rotor that rotates inside a stationary stator that surrounds the rotor, techniques disclosed herein may be applied advantageously to use in an outrunner configuration motor, in which a rotor comprising a magnet array rotates around an inner stator and the magnetic field of the rotor is concentrated on the inside of the magnet array instead of the outside.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A rotor assembly, comprising:
a plurality of magnets each having a long dimension and a longitudinal axis associated with the long dimension, the plurality of magnets each having a corresponding magnetic pole orthogonal to the longitudinal axis and the magnets being arranged and oriented relative to adjacent ones of the magnets to form a substantially cylindrical Halbach array the combined magnetic field of which is concentrated on an outer cylindrical surface side of the substantially cylindrical Halbach array, wherein the substantially cylindrical Halbach array has a rotational axis and each of at least a subset of the magnets is oriented in a fixed position such that the longitudinal axis of the magnet is at a prescribed skew angle to the rotational axis; and
a retaining structure adjacent to at least a subset of the magnets comprising the plurality of magnets and configured to hold one or more of said subset of magnets in place;
wherein each of the magnets has a first end at a first extreme of the longitudinal axis and a second end at a second extreme of the longitudinal axis; and the retaining structure comprises an end plate that includes a plurality of evenly spaced angled block structures, each angled block structure including a ramp or wedge portion to receive the first end of a magnet included in the plurality of magnets and hold the magnet at the prescribed skew angle.

2. The rotor assembly of claim 1, wherein the retaining structure further comprises one or more of epoxy, other polymer, and other structural adhesive materials.

3. The rotor assembly of claim 1, wherein the retaining structure further comprises a magnet guide.

4. The rotor assembly of claim 3, wherein the magnet guide comprises a plastic.

5. The rotor assembly of claim 1, wherein the end plate comprises aluminum.

6. The rotor assembly of claim 1, wherein the retaining structure comprises or is adapted to receive and be fixedly coupled to a shaft or other power takeoff structure comprising the rotor assembly.

7. The rotor assembly of claim 1, wherein the magnets are substantially rectangular in shape.

8. The rotor assembly of claim 1, wherein the angled block structure further comprises an end tab to prevent the magnet from slipping out of the angled block structure.

9. The rotor assembly of claim 1, wherein the retaining structure further comprises a retainer ring.

10. The rotor assembly of claim 1, wherein the retainer ring is positioned at the second end of the respective magnets comprising the plurality of magnets.

11. The rotor assembly of claim 1, further comprising a plurality of fasteners to secure the retainer ring to the end plate to secure the plurality of magnets between the end plate and the retainer ring.

* * * * *